United States Patent [19]
Goldbach

[11] 3,956,518
[45] May 11, 1976

[54] METHOD OF SLICING AND STACKING CHEESE

[75] Inventor: Raymond A. Goldbach, Marathon, Wis.

[73] Assignee: Kraftco Corporation, Glenview, Ill.

[22] Filed: Oct. 29, 1974

[21] Appl. No.: 518,180

Related U.S. Application Data

[63] Continuation of Ser. No. 260,287, June 6, 1972, abandoned.

[52] U.S. Cl. .................................. 426/518; D1/21; D1/25; 83/29; 83/91; 83/161; 426/144; 426/582
[51] Int. Cl.² ...................... A01J 27/00; B26D 7/06
[58] Field of Search .......... 426/144, 518, 420, 414, 426/130, 188, 145, 274, 582, 515, 517; D1/21, 23, 25, 27, 99; 53/23, 123; 83/5, 29, 89, 86, 94, 13, 161, 23, 91

[56] References Cited
UNITED STATES PATENTS

| | | | |
|---|---|---|---|
| 422,370 | 3/1890 | Brott | 426/144 X |
| 678,514 | 7/1901 | Regnier | 426/144 |
| 1,087,335 | 2/1914 | Swartz | 426/144 |
| 1,310,261 | 7/1919 | Van Berkel | 83/88 |
| 1,783,040 | 11/1930 | Guay et al. | 83/57 |
| 2,635,965 | 4/1953 | Hensgen et al. | 426/414 |
| 2,686,720 | 8/1954 | La Rosa | 426/144 |
| 3,057,386 | 10/1962 | Massaro | 426/518 |
| 3,863,020 | 1/1975 | Robinson | 426/420 |
| D32,780 | 6/1900 | Moxley | D1/25 |
| D32,781 | 6/1900 | Moxley | D1/25 |
| D34,052 | 2/1901 | Simon | D1/25 |

FOREIGN PATENTS OR APPLICATIONS 701,899  1/1965  Canada .............................. 426/144

OTHER PUBLICATIONS

Danish Foreign Office J. 1947, p. 4.

*Primary Examiner*—Frank W. Lutter
*Assistant Examiner*—Steven L. Weinstein
*Attorney, Agent, or Firm*—Fitch, Even, Tabin & Luedeka

[57] ABSTRACT

A method of preparing and stacking sliced food products, such as natural cheese and the like, wherein the surfaces of the slices have non-planar configurations, and the stacked slices are oriented in a manner to effect minimum surface contact between adjacent surfaces to facilitate separation of the stacked slices.

2 Claims, 5 Drawing Figures

METHOD OF SLICING AND STACKING CHEESE

The present application is a continuation of application, Ser. No. 260,287, filed June 6, 1972, now abandoned, and relates generally to food products which lend themselves to slicing and stacking and more particularly it relates to a novel method of preparing and stacking sliced food products which tend to be tacky or stick together, such as natural cheese, to facilitate separation of the stacked slices.

It is customary in certain food product lines to slice a block or bulk quantity of the food product and stack the resulting slices into stacks which can then be packaged. In general, the food product must be such that when sliced, the slices have sufficient inherent strength to allow handling without breaking apart as would be the case with jelly products and the like. A number of food products, and in particular natural chesse may be readily sliced from a block and the slices then stacked, but the sliced material when disposed in abutting face-to-face relation has a tendency to adhere together thereby making subsequent separation of the stacked slices difficult. The present invention overcomes this problem by providing a method for preparing and stacking sliced food products, such as cheese, in a manner which minimizes the natural tendency of the slices of these food products to adhere to one another and thereby greatly facilitates separation of the stacked slices.

Accordingly, one of the primary objects of the present invention is to provide a method for slicing and stacking food products which method facilitates subsequent separation of the stacked slices.

Another object of the present invention is to provide a method for preparing and stacking food products wherein the food products are sliced to provide non-planar surfaces and the slices are stacked in a manner to effect minimum surface contact between adjacent slices.

A further object of the invention is to provide a method for preparing and stacking food products wherein the slices have corrugated or rippled surfaces and are stacked so that the corrugations of adjacent surfaces are angularly disposed relative to each other.

A still further object of the present invention is to provide a food product comprising a plurality of stacked slices having non-planar surfaces oriented to minimize surface contact between adjacent surfaces and facilitate separation of the slices.

A feature of the present invention lies in its adaptability to various non-planar configurations for the surfaces of the food product slices, the slices thereafter being oriented in stacked relation to prevent full surface contact or nesting between adjacent slices.

Further objects and advantages of the present invention will become apparent from the followng detailed description thereof when taken in conjunction with the accompanying drawing wherein like reference numerals designate like elements throughout the several views, and wherein.

Figure 1:
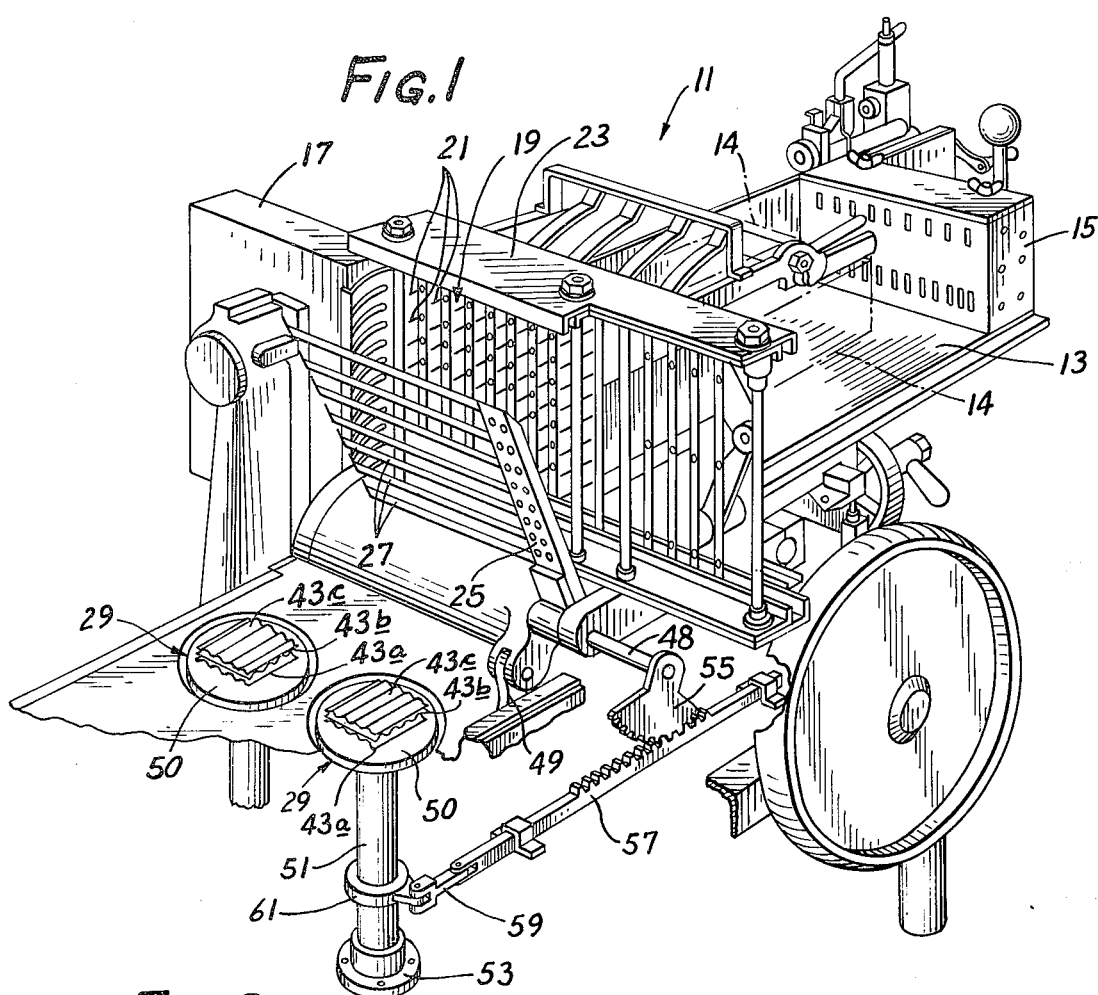
FIG. 1 is a partial perspective view of a slicing machine adapted for preparing and stacking sliced food products in accordance with the present invention.

Referring now to the drawing, and in particular to FIG. 1, the present invention is illustrated, by way of example only, in conjunction with a slicing machine, indicated generally at 11. The slicing machine 11 is generally of the type commercially available, but modified through the provision of cutter blade means and stacking means to facilitate carrying out the present invention. The particular details of the slicing machine 11 and its general mode of operation are well known and will not be described in detail herein.

Figure 2:
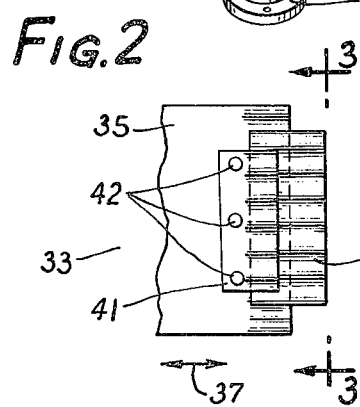
FIG. 2 is a partial front elevational view of a cutter blade assembly as may be employed in the slicing machine of FIG. 1.

Briefly, the slicing machine 11 includes a support table 13 upon which bulk quantities of food products, such as blocks of cheese shown partially in phantom at 14, may be supported preparatory to slicing the same. The slicing machine 11 includes pusher means 15 adapted to feed the bulk food products on the support table 13 forwardly to a slicing station disposed generally adjacent a slicing knife, such as shown in FIG. 2, in a blade housing 17. As the food products are sliced by the slicing knife disposed within the housing 17, the slices are impaled upon a moveable impaling device, indicated generally at 19, which includes a plurality of outwardly extending prongs 21. The impaling device 19 is adapted to move the slices from one side of a support 23 to the other side thereof. Vertical members of the impaling device 19 upon which the prongs 21 are affixed are secured together in a chain-like manner so that the prongs 21 may have a slice of food product thereon as it is sliced from the block, the impaling device and associated prongs thereafter carrying the slice around to the opposite or rearward side of the support 23 and rearwardly of slice removal member 25.

The slice removal member 25 includes a plurality of parallel spaced bars 27 which serve to remove the slices of the food product from the prongs 21 in a known manner and deposit them in stacked formation on food receiving and support members 29 to be described in greater detail below. In the slicing machine illustrated in FIG. 1, two loaves or blocks of a food product may be supported on the support table 13 and sliced to allow the simultaneous preparation of two stacks.

FIG. 2 illustrates a slicing knife assembly, indicated generally at 33, which may be employed in the slicing machine of FIG. 1. The slicing knife assembly 33 includes a carrying plate 35 which is suitably supported within the blade housing 17 for reciprocating movement in a direction transverse to the direction of movement of the food product 14, as indicated by the double headed arrow 37. The mechanism for effecting such reciprocating movement of the carrying plate 35 of the knife assembly 33 in synchronization with the operation of the slicing machine 11 does not, per se, form part of the present invention and will not be described in greater detail herein, it being understood that means for effecting reciprocating movement of the knife assembly 33 are well known.

The carrying plate 35 may comprise the circular knife of a slicer which has been locked in a fixed position, thus making the invention readily applicable to commercially available slicers. The carrying plate 35 supports a slicing knife 39 which is secured on the carrying plate 35 by a lock plate 41 secured to the carrying plate by suitable screw or bolt means 42.

Figure 3:
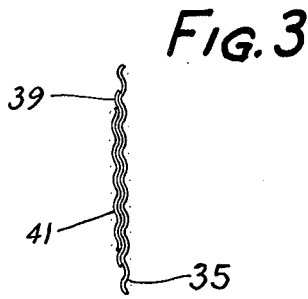
FIG. 3 is an end view of the cutter blade assembly of FIG. 2, taken generally along the line 3—3 of FIG. 2 and looking in the direction of the arrows.

Noting FIG. 3, the slicing knife 39 is rippled or corrugated in generally sinusoidal configuration so as to cut slices having rippled or corrugated surfaces from the blocks of food products. The end portion of the carrying plate 35 which underlies the knife blade 39, and the portion of the lock plate 41 which overlies the slicing blade 39 have correspondingly shaped corrugated configurations to firmly retain the knife blade in mounted relation therebetween. The weight of the slicing blade 39 is sufficient to effect slicing of the blocks of food product 14 disposed on the support table 13 of the slicing machine 11 and the stroke of the knife assembly 33 is sufficient to cut two blocks 14 on the support table 13.

The invention contemplates slicing bulk blocks of food products and thereafter stacking the slices in a manner to facilitate separation of the stacked slices. The invention finds particular application in the slicing and stacking of food products, such as cheese, where the product has sufficient inherent strength to generally maintain the shape when the slices are stacked and allow handling of the individual slices without tearing or breaking apart such as would be experienced in jelly like products.

Figure 4:
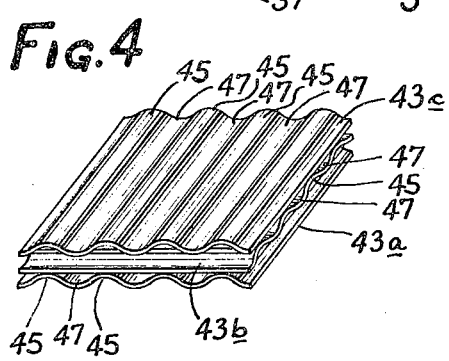
FIG. 4 is an enlarged perspective view of a plurality of stacked slices of a food product in accordance with the present invention.

With particular reference to FIG. 4, the present invention contemplates slicing the bulk blocks of food products such that each slice has non-planar surfaces. FIG. 4 illustrates three slices 43a, 43b and 43c of a food product, such as cheese, the slices being stacked in accordance with the present invention. Each of the slices 43a, 43b and 43c has rippled or corrugated surfaces comprising ridges 45 and intermediate grooves 47 which are disposed in parallel relation. It will be understood that with relatively thin slices as shown, the portion of each slice surface comprising a raised ridge may constitute a groove when considered from the opposite surface.

The slices 43a, 43b and 43c are stacked in predetermined oriented relation such that the adjacent surfaces of the stacked slices are in substantially minimum surface contact. For example, in accordance with the illustrated embodiment, the slice 43b is oriented relative to the lower slice 43a such that the ridge portions 45 of the lower surface of slice 43b are disposed in nonparallel relation, substantially 90° in the drawing, to the ridges 45 of the adjacent upper surface of the lower slice 43a. Similarly, the ridges 45 of the upper slice 43c are oriented approximately 90° to the ridges of the adjacent surface of the intermediate slice 43b. As noted, the food products with which the present invention finds particular application are those wherein the individual slices exhibit inherent strength sufficient to maintain the configuration in which they have been sliced. In this manner, it can be seen that through providing ridge-to-ridge contact between the adjacent surfaces of the stacked slices, minimum surface contact is obtained and the normal tendency of the food product slices to adhere one to another is substantially minimized whereby to facilitate separation of the stacked sliced. It will be further understood that it is conventional to provide any number of slices in a stack depending upon the selected manner of marketing and sale of the slice food products.

Referring again to FIG. 1, one method of stacking the slices 43a, 43b and 43c will be described in conjunction with the illustrated slicing machine 11. The slice removal member 25 is fixed to an oscillating shaft 48 which is operated by certain operating mechanism of the slicing machine as each slice is cut, in a known manner. The shaft 48 may be oscillated by appropriate means to effect operation of the slice removal member 25 immediately after each slice and is impaled on the impaling device 19. Preferably, means (not shown) are incorporated into the slicing machine 11 to effect oscillation of the slice removal member 25 in timed relation with an operable part of the slicing machine such as a crank arm 49.

The slice receiving and support members 29 comprise generally circular support plates 50 each of which is supported on a rotatable support shaft 51. Each of the support shafts 51 is mounted in upstanding relation on the slicing machine frame by a bearing support housing, one of which is shown at 53. Means are provided to effect rotating movement of the slice receiving and support plates 29 between positions disposed approximately 90 arcuate degrees to each other, the support plates 29 being disposed in a first position when the slice removal member 25 lowers first slices to the slice support plates 50, and being rotated 90° when the slice removal member lowers the next successive slices to the receiving and support plate members 29.

One such means for carrying out rotation of the slice receiving and support plates 29 is illustrated in FIG. 1 and includes a gear segment 55 carried on the outer end of the oscillating shaft 48. The teeth of the gear segment 55 mesh with a rack 57 which is supported for longitudinal reciprocating movement on the frame of the slicing machine 11. The end of the rack member 57 opposite the gear segment 55 is provided with a connecting link 59 which pivotally interconnects the rack member 57 to a one-way clutch mechanism 61, such as a Sprague type clutch, which is supported on and effective to rotate an associated support shaft 51 in one direction. The support shafts 51 are interconnected by means (not shown) to effect simultaneous corresponding movement of both of the support shafts upon reciprocation of the rack member 57. The rack member 57 undergoes sufficient movement with each cycle of the shaft 48 to effect 90° rotation of the associated shaft 51 and support plate 29. In this fashion, each time the slice removal member 25 is lowered to move a pair of slices of food product 14 to the support plates 29, the support plates will have undergone a rotational movement of approximately 90° relative to their positions when the previous slices were deposited thereon.

Figure 5:
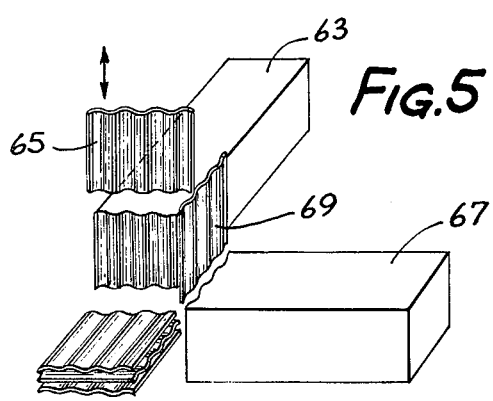
FIG. 5 is a perspective view schematically illustrating an alternative manner of slicing and stacking food products in accordance with the present invention.

FIG. 5 schematically illustrates an alternative manner of preparing and stacking slices of food product in accordance with the present invention. As therein illustrated, a first block of food product 63, such as cheese, is disposed with its longitudinal axis in predetermined relation relative to a vertically reciprocating slicing knife or blade 65 adapted to slice corrugated slices from the block 63. A second bulk block of food product 67 is supported on the same horizontal plane as the first block 63 but with the axis of the second block disposed substantially perpendicular to the longitudinal axis of the first block 63. A second vertically reciprocating slicing knife or blade 69 is operative with the second block of food product 67 to effect slicing of corrugated slices therefrom. The vertically reciprocating slicing blades 65 and 69 are adapted for alternate slicing of the associated blocks of food product 63 and 67, with each successive slice being moved to a lowered or stacked position such that the corrugations on each slice are disposed approximately 90° to the corrugations of the preceding lowered slice. In this manner, a stack of slices is produced which is generally similar to the stack of slices illustrated in FIG. 4, the slices having minimum surface contact therebetween to facilitate separation of the stacked slices.

In summary, the method of preparing and stacking slices of food products from bulk quantities thereof in accordance with the invention is briefly as follows. First, slices of a food product are cut from a bulk or block quantity of the food product so that the surfaces of the slices have non-planar configurations, such as the indicated rippled or corrugated surfaces. When employing a slicing machine 11, as illustrated in FIG. 1, each slice will have the surface corrugations thereon oriented in identical relation to the preceding slice. As successive slices are transferred to the receiving and support plates 29, the support plates are rotated approximately 90° after receiving each successive slice thereon so that the corrugations in each successive slice are oriented approximately 90° relative to the surface corrugations of the preceding slice. While carrying out the present invention in accordance with described FIG. 5, the slices cut from the first and second blocks of food product 63 and 67, respectively, are alternately moved to their lowered positions such that the corrugations in each slice are disposed approximately 90° to the corrugations of the next preceding slice and, correspondingly, 90° to the corrugations of the next successive slice to be received thereon.

Thus, in accordance with the invention, a stacked food product is provided wherein at least one surface of each slice of the food product has a non-planar configuration which, in stacked relation, is oriented to effect minimum surface contact with the adjacent slice of the stack. In the described embodiment, the slices of cheese or other food product have corrugated configurations with the corrugations of overlying slices being oriented approximately 90° relative to the corrugations of the preceding slice in the stack whereby to effect minimum surface contact therebetween and facilitate separation of the stacked slices. The method in accordance with the present invention includes broadly the steps of slicing a bulk quantity of a food product into a plurality of slices such that at least one surface of each slice is non-planar, and stacking the slices such that successive slices are oriented in a manner to prevent full surface contact between adjacent surfaces of the stacked slices.

In the above described embodiments of the invention, the ripples or corrugations in the slices run in the same direction by reason of the slicing knife repetitively cutting through the block in the same direction. However, the block may be rotated relative to the knife or, alternatively, the knife may be rotated relative to the block whereby the receiving plates 50 need not be rotated and the slices will have adjacent surfaces with the ridges and troughs being rotated in successive surfaces. In this connection, the thickness of the slices can be reduced so that the slicing knife intersects successive corrugations leaving voids in the slices and providing a lace-like pattern in the slice. This has desirable attributes in connection with some uses of food products, as for example, in the case of cheese when it is melted on top of a pizza. Of course, with thicker slices, the knife will not intersect the corrugations and there will not be voids in the slices.

It will be appreciated that the two blocks of food product need not be the same product and it is possible to provide blocks of meat, such as ham, alongside blocks of cheese. The slices of ham and cheese can thus be alternated and provide a stack of food products which can be readily separated one product from the other. The invention has particular applicability to food products which stick or are tacky and thus the invention has particular adaptability to natural cheese.

While preferred embodiments of the invention have been illustrated and/or described, it will be understood to those skilled in the art that changes and modifications may be made therein without departing from the invention in its broader aspects. Various features of the invention which are believed to be new are set forth in the attached claims:

What is claimed is:
1. A method of preparing a stack of slices of cheese which are characterized as being tacky and which tend to adhere to the surfaces of adjacent slices and inhibit separation of the individual slices when in stacked substantially full surface contact therewith, said method facilitating separation of the stacked slices and comprising the steps of progressively feeding a bulk quantity of cheese to a slicing station, slicing said bulk quantity of cheese into a plurality of slices such that the opposite stacking surfaces of each slice are corrugated to define substantially straight parallel ridges and troughs, said slices each having substantially greater length and width than thickness, transferring each successive slice of cheese to a stacking station for deposit on the preceding slice, and positioning the stack of slices between transfer of each successive slice to said stacking station such that the ridges of the corrugations of each successive slice are disposed approximately 90° to the ridges of the adjacent slice surface so that only portions of the ridges of adjacent slices are in contact whereby to minimize surface contact between adjacent surfaces of the stacked slices.

2. The method of claim 1 wherein said cheese comprises natural cheese.

* * * * *